Aug. 21, 1956  D. O. McCOY ET AL  2,760,189
RANGE STABILIZING APPARATUS
Filed May 4, 1951  2 Sheets-Sheet 2

INVENTORS
DAVID O. McCOY
BY NOEL W. HANCOCK
Marvin Moody
ATTORNEY

United States Patent Office 2,760,189
Patented Aug. 21, 1956

2,760,189

RANGE STABILIZING APPARATUS

David O. McCoy and Noel W. Hancock, Cedar Rapids, Iowa, assignors to Collins Radio Company, Cedar Rapids, Iowa, a corporation of Iowa Application May 4, 1951, Serial No. 224,624

3 Claims. (Cl. 343—7.3)

This invention relates in general to an automatic ranging unit and in particular to means for quickly and accurately controlling the range unit of a radar set.

Oftentimes it is desirable to measure the distance to a target shown on a radar scope. This may be accomplished by superimposing a gate on the received video and measuring the time between the transmission of the pulse and the occurrence of the gate. Such ranging systems are shown and described in our co-pending applications Serial No. 128,980 filed November 23, 1949, entitled Master Timer now Patent No. 2,614,218, and Serial No. 218,359 filed March 30, 1951, entitled High Speed Slewing now Patent No. 2,611,893. Reference may be made to these applications for a more detailed discussion of ranging systems.

This invention relates to a tracking means for maintaining the gate formed by the ranging unit in synchronism with a received pulse so that the distance to the target may be continuously known. For example, if there is relative motion between the radar set and the target, it becomes necessary to maintain a continually changing range indication. Automatic ranging systems have been previously known, but generally have used all of the received video signal to control the range driving mechanism. Video of various shapes and time interval result in different control signals being fed to the range controlling unit.

It is an object of this invention, therefore, to provide an automatic ranging unit wherein the received video signal is changed to a standard pulse corresponding in time to the leading edge of the received video.

A further object of this invention is to provide a motor control circuit which is actuated by mixing a derived pulse with a pair of saw-toothed waves, one of which waves has been reversed to obtain a motor control signal.

Still another object of this invention is to provide an automatic ranging unit which will produce a motor control signal proportional to the deviation of the received video from the center of the range gate.

A feature of this invention is found in the provision for a synthetic pulse generator which produces a standard reference pulse corresponding in time with the leading edge of the received video signal and which is compared with a pair of saw-toothed waves in synchronism, wherein one of the saw-toothed waves is reversed with respect to the other wave to obtain a motor control signal.

Further objects, features and advantages of this invention will become apparent from the following description and claims when read in view of the drawings, in which;

Figure 1:
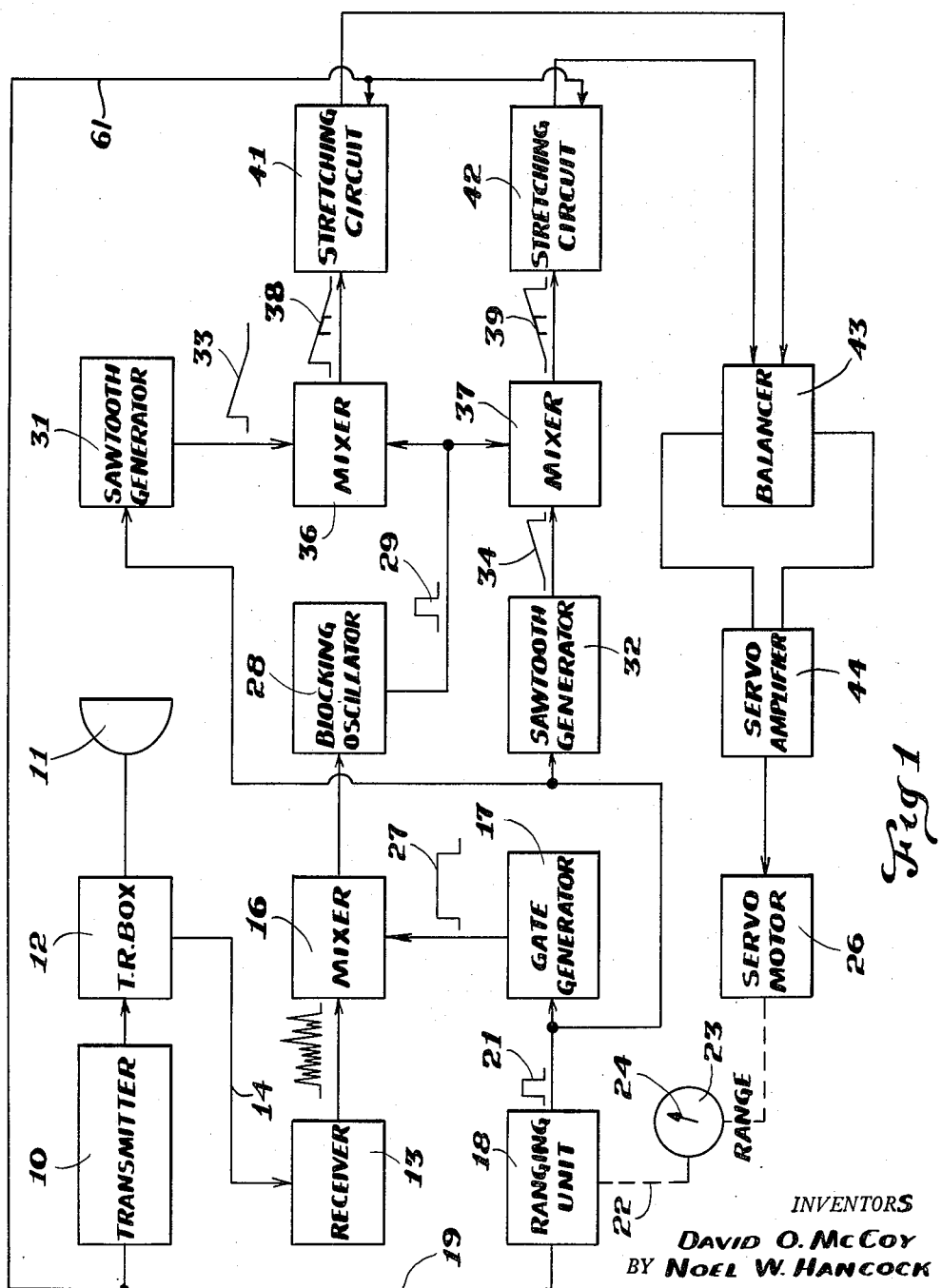
Figure 1 is a schematic illustration of the automatic ranging apparatus of this invention.

With reference to Figure 1, a radar transmitter is designated as 10 and feeds an output to an antenna 11 through a T. R. box 12. T. R. boxes are well known to those skilled in the art and comprise valves wherein energy may be channeled in a particular direction.

The T. R. box 12 is also connected to a receiver 13 by the lead 14 and when the transmitter 10 is supplying energy to the T. R. box 12 all of this energy passes to the antenna 11 and none of it passes through the lead 14 to the receiver 13. However, when energy is being received by the antenna 11 the T. R. box 12 furnishes all of this energy to the receiver 13 and allows none of it to pass to the transmitter 10.

Thus means are provided for periodically radiating a transmitted pulse from the antenna 11 and receiving any echo which may return. The received video is detected by the receiver 13 and supplied to a mixer 16. The mixer 16 receives an input from a gate generator 17 which supplies a pedestal, or gate, to the mixer 16.

The gate generator 17 is actuated by a ranging unit 18 which is the master timing unit of the system and serves to measure the time between the transmitted signal and the received signal. The ranging unit receives an input from the transmitter 10 through the lead 19 each time the transmitter fires, and produces a reference pulse 21 a controllable time after receiving the transmitted pulse from the transmitter 10. A shaft 22 is connected to the ranging unit 18 and the position of this shaft controls the time differential between the transmitted pulse and the reference pulse 21. For a more complete description of the ranging unit, reference may be made to the previously referenced copending applications. An indicator 23 has a rotatable pointer 24 mounted on the shaft 22 and indicates to the operator the range or distance to the target. A motor 26 is also mounted on the shaft 22 and drives it in response to control signals to be described later.

Thus, the problem presented and solved by this invention is to provide a motor control circuit which controls the motor 26 so that the pulse 21 from the ranging unit 18 has a definite time relationship with the received video. In the apparatus which applicant has constructed it is desired to keep the leading edge of the video in the center of the gate 27 produced by the gate generator 17. The mixer 16 receives the video from receiver 13 and the gate from the gate generator 17 and allows all video to pass which occurs during the occurrence of a gate.

The output of the mixer 16 is furnished to a blocking oscillator 28 which produces a relatively short pulse upon the reception of video from the mixer 16. The pulse produced by the oscillator 28 corresponds in time with the leading edge of the video signal and thus, the pulse 29 produced by the oscillator 28 will have the same shape and position with respect to any received video.

A pair of saw-tooth generators 31 and 32 also receive the pulse 21 from the ranging unit 18 and produce saw-tooth waves 33 and 34, respectively, each time a pulse 21 is received. The saw-tooth generator 31 produces a saw-tooth 33 which has a steep leading edge and then slopes linearly downward, whereas the generator 32 produces a saw-tooth wave which slopes linearly upward and then drops sharply to zero again. The waves 33 and 34 are of the same length and are equal to the length of the gate 27.

A mixer 36 receives the output of generator 31 and a mixer 37 receives the output of the generator 32. The mixer 36 mixes the pulse 29 with the saw-tooth 33 and the mixer 37 mixes the pulse 29 with the saw-tooth 34. The output of mixer 36 will be a pulse 38 which has an amplitude equal to the amplitude of the pulse 33 at the time the pulse 29 occurred. Likewise, the amplitude of the pulse 39 out of mixer 37 will have an amplitude equal to the amplitude of pulse 34 at the time the pulse 29 occurred.

A stretching circuit 41 receives the output of mixer 36 and a stretching circuit 42 receives the output of the mixer 37. The stretching circuit 41 produces a direct current output with an amplitude proportional to the average amplitude of the pulse 38. Likewise, the stretching circuit 42 produces an output pulse proportional to the average amplitude of the pulse 39. The output of stretchers 41 and 42 continues for a time substantially greater than the length of the gate 27 and for a substantial portion of the time between transmittal of adjacent pulses from the transmitter 10.

Figure 4:
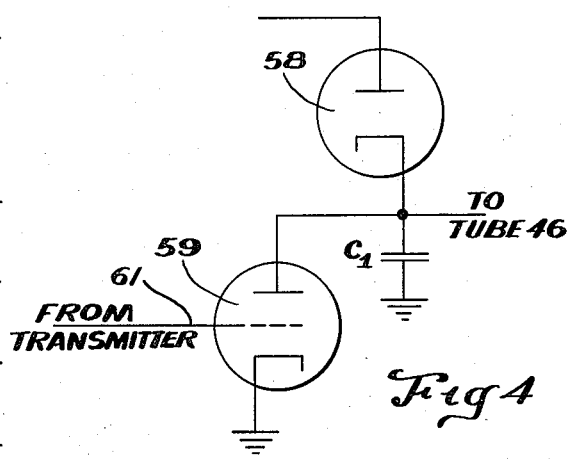

A stretching circuit such as 41 and 42 is shown in detail in Figure 4. Since both circuits are the same, only one is shown. The pulse 38 from mixer 36 is fed to a diode rectifier 58. The diode passes the pulse and it charges a condenser $C_1$ to a voltage proportional to the amplitude of the pulse 38. The opposite side of condenser $C_1$ is connected to ground.

The grid 51 of a tube 46 in a balancer 43 is connected to the condenser $C_1$ and thus the output of tube 46 will be proportional to the amplitude of pulse 38.

A triode tube 59 has its plate connected to the condenser $C_1$ and its cathode connected to ground. This tube is normally biased to cut-off and its grid receives an input from the transmitter 10 when a pulse is transmitted through the lead 61. When a pulse is received from the transmitter the tube 59 conducts and provides a low resistance path to ground to discharge the condenser $C_1$. The voltage of the condenser remains substantially constant after receiving a pulse 38 until it is discharged by tube 59. The reason for this is that there is no discharge path until the tube 59 conducts. The stretching circuit 42 is identical to the stretching circuit 41 but receives pulse 39 instead of pulse 38 and supplies an output to tube 47 instead of tube 46.

The balancer 43 receives the output of the stretching circuits 41 and 42 to compare them and produce an output proportional to their difference. A servo amplifier 44 receives the output of the balancer 43 and amplifies the signal before furnishing it to the motor 26. The motor 26 is actuated by the output of the amplifier 44 and runs until the output of the amplifier 44 is zero. The output of the balancer 43 will be zero only when the amplitudes of pulses 38 and 39 are equal, which means that the pulse 29 occurs at the middle of the pulses 33 and 34. When this condition exists, the pulses 38 and 39 will be equal in amplitude and the output of the balancer 43 will be zero.

Figure 2:
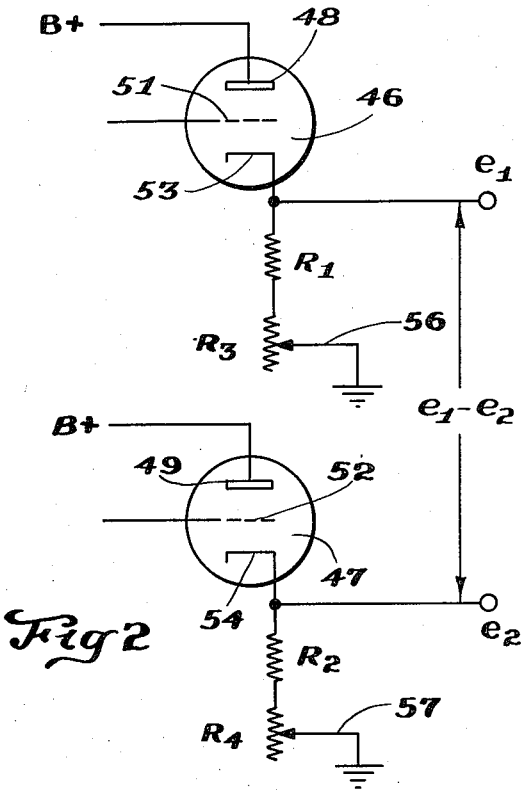
Figure 2 is a detailed view illustrating a balancer such as shown in Figure 1.

The balancer 43 is shown in detail in Figure 2 and comprises a pair of tubes 46 and 47, respectively, which have their plates 48 and 49, respectively, connected to B plus and their grids 51 and 52, respectively, connected to the outputs of stretchers 41 and 42, respectively. The cathodes 53 and 54, respectively, are connected to resistors $R_1$ and $R_2$, respectively, which are in series with ground through variable resistors $R_3$ and $R_4$. Slide contacts 56 and 57 may be adjusted to obtain a balanced condition. An output $e_1$ is taken from the cathode 53 of tube 46 and an output $e_2$ is taken from the cathode 54 of tube 47. The voltage $e_1-e_2$ is proportional to the displacement of the pulse 29 from the center point of the pulses 33 and 34 and it is this voltage which is fed to servo amplifier 44.

Figure 3:
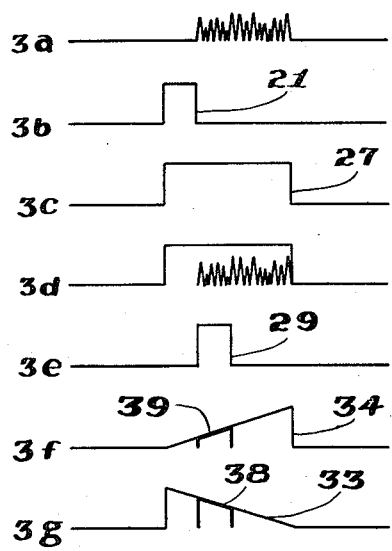
Figure 3 illustrates pulse shapes appearing at different points in the system of this invention in their respective time relationships; and, Figure 4 is a detail view of the stretching circuit of this invention.

Figure 3 illustrates the time relationship between the various pulses of this system. Figure $3_a$ illustrates the received video fed by the receiver 13 into mixer 16. Figure $3_b$ illustrates the master ranging pulse 21 produced by the ranging unit 18. Figure $3_c$ illustrates the gate produced by the gate generator 17 and it is to be noted that its leading edge corresponds to the leading edge of the master control pulse 21. Figure $3_d$ illustrates the output of mixer 16 showing the video and the gate 27. Figure $3_e$ illustrates the output of the blocking oscillator 28 and it is to be noted that this pulse has its leading edge in synchronism with the leading edge of the video. Figure $3_f$ illustrates the time relationship of pulse 34 with pulse 29, and it is to be noted that it corresponds in time with the gate 27. The pulse 39 is in time synchronism with the pulse 29 and, likewise Figure $3_g$ illustrates the saw-tooth 33 with the pulse 38 in time synchronism with the pulse 29.

In operation the range control apparatus of this invention continually maintains the leading edge of any received video in the center of the range gate and the distance to the target is known. It is seen that this invention provides means for automatically presenting the range of a target.

Although the invention has been described with respect to preferred embodiments thereof, it is not to be so limited that changes and modifications may be made therein which are within the full intended scope of the invention as defined by the appended claims.

We claim:

1. Means for automatically tracking a target with a radar set having a transmitter, receiver, and a ranging unit, comprising, a driving means supplying a shaft input to said ranging unit, a first saw-tooth generator, a second saw-tooth generator, a gate generator, said saw-tooth generators and gate generator receiving inputs from the ranging unit, a first mixer receiving a gate from the gate generator and the video from the radar receiver, a blocking oscillator receiving the gated video from the first mixer and producing a pulse coincident with the leading edge of the gated video, a second mixer receiving an input from the first saw-tooth generator and said blocking oscillator, a third mixer receiving an input from the second saw-tooth generator and said blocking oscillator, a first stretching circuit receiving the output of the second mixer, a second stretching circuit receiving the output from the third mixer, a balancer receiving the outputs of the first and second stretching circuits to compare them and produce an output proportional to their difference, and said driving means receiving an input from said balancer.

2. Means for producing a synthetic video signal for controlling the ranging unit of a radar set comprising, a gate generator receiving a range pulse from the ranging unit and producing a gate in response thereto, a mixer receiving the gate from the gate generator and the video from the radar receiver, a pair of saw-tooth generators triggered by the range pulse of the ranging unit, a blocking oscillator receiving the output of the first mixer and producing a pulse coincident with the leading edge of the gated video, second and third mixers receiving the output of the blocking oscillator, said second mixer receiving the output of one of the saw-tooth generators, the third mixer receiving the output of the other saw-tooth generator, the saw-tooth generators producing saw-tooths of opposite slope, a first stretching circuit receiving the output of the second mixer, a second stretching circuit receiving the output of the third mixer, a balancer receiving the outputs of the first and second stretching circuits to compare them and produce an output proportional to the difference, and said driving means receiving the output of said balancer.

3. Means for controlling the ranging unit in a radar set comprising, a blocking oscillator receiving gated video from the receiver and producing a control pulse coincident with the leading edge of the gated video, a pair of mixers receiving the output of the blocking oscillator, a first saw-tooth generator receiving a range reference pulse from the ranging unit and producing a saw-tooth pulse with a sharp leading edge and supplying an input to the first mixer, a second saw-tooth generator receiving a range reference pulse from the ranging unit and producing a saw-tooth wave with a sharp trailing edge and supplying an input to said second mixer, said first mixer producing a pulse with an amplitude proportional to the position of the control pulse with respect to the trailing edge of the gate, said second mixer producing a pulse with an amplitude proportional to the position of the control pulse with reference to the leading edge of the gate, a balancer receiving the outputs of the first and second mixers to compare their amplitudes and produce an output equal to their difference, and a driving means connected to the range controlling shaft of the range unit receiving an input from said balancer.

References Cited in the file of this patent

UNITED STATES PATENTS

| Number | Name | Date |
|---|---|---|
| 2,448,027 | Grieg | Aug. 31, 1948 |
| 2,462,859 | Grieg | Mar. 1, 1949 |
| 2,482,544 | Jacobsen | Sept. 20, 1949 |
| 2,502,454 | Grieg | Apr. 4, 1950 |
| 2,541,276 | Oliver | Feb. 13, 1951 |
| 2,609,533 | Jacobsen | Sept. 2, 1952 |

FOREIGN PATENTS

| Number | Country | Date |
|---|---|---|
| 124,653 | Australia | June 19, 1947 |
| 124,503 | Australia | June 5, 1947 |